United States Patent
Jones

(10) Patent No.: US 11,047,323 B2
(45) Date of Patent: Jun. 29, 2021

(54) ENGINE SYNCHRONISATION MEANS

(71) Applicant: DELPHI TECHNOLOGIES IP LIMITED, St. Michael (BB)

(72) Inventor: Quenton M. Jones, St. Albans (GB)

(73) Assignee: DELPHI TECHNOLOGIES IP LIMITED

( * ) Notice: Subject to any disclaimer, the term of this patent is extended or adjusted under 35 U.S.C. 154(b) by 290 days.

(21) Appl. No.: 16/331,605

(22) PCT Filed: Aug. 28, 2017

(86) PCT No.: PCT/EP2017/071549
§ 371 (c)(1),
(2) Date: Mar. 8, 2019

(87) PCT Pub. No.: WO2018/046332
PCT Pub. Date: Mar. 15, 2018

(65) Prior Publication Data
US 2019/0360410 A1 Nov. 28, 2019

(30) Foreign Application Priority Data
Sep. 8, 2016 (GB) ...................................... 1615293

(51) Int. Cl.
*F02D 41/00* (2006.01)
*G01M 15/06* (2006.01)
*F16H 1/02* (2006.01)

(52) U.S. Cl.
CPC ........... *F02D 41/009* (2013.01); *G01M 15/06* (2013.01); *F16H 1/02* (2013.01)

(58) Field of Classification Search
CPC ........... F02D 41/009; F02D 2041/0092; F02D 41/2422; F02D 41/062; G01M 15/06; F16H 1/02; G01D 5/2492
See application file for complete search history.

(56) References Cited

U.S. PATENT DOCUMENTS

| | | | |
|---|---|---|---|
| 5,460,134 A | 10/1995 | Ott et al. | |
| 6,041,647 A | 3/2000 | Matsuoka | |
| 6,172,500 B1 | 1/2001 | Bicking | |
| 6,415,655 B2 | 7/2002 | Loof et al. | |
| 6,752,009 B2 * | 6/2004 | Minich | G01M 15/06 73/114.27 |
| 7,013,719 B2 | 3/2006 | Adachi et al. | |

(Continued)

FOREIGN PATENT DOCUMENTS

| EP | 638717 A2 | 2/1995 |
|---|---|---|
| WO | 2008140404 A1 | 11/2008 |

*Primary Examiner* — Freddie Kirkland, III
(74) *Attorney, Agent, or Firm* — Joshua M. Haines

(57) ABSTRACT

An engine synchronisation arrangement of an internal combustion engine having a crank-shaft and a camshaft geared together with a fixed rotation ratio includes a crank-shaft wheel cooperating with a first sensor and, a camshaft wheel cooperating with a second sensor, both wheels being provided with peripheral features. Both sensors detect the features and communicate to an ECU binary signals. The features of the crank-shaft wheel are arranged in a sequential pattern, and a sliding window of a specific width covers a unique set of features corresponding to a unique string of consecutive bits mapping to a unique angular position of the crank-shaft.

16 Claims, 5 Drawing Sheets

(56) References Cited

U.S. PATENT DOCUMENTS

| | | | |
|---|---|---|---|
| 7,289,932 B2 * | 10/2007 | Woody | F02D 41/009 |
| | | | 702/163 |
| 7,772,837 B2 * | 8/2010 | Kassner | F02D 41/009 |
| | | | 324/207.25 |
| 10,533,509 B2 * | 1/2020 | Zouboff | F02D 41/062 |
| 2006/0111867 A1 | 5/2006 | Woody | |
| 2008/0210021 A1 | 9/2008 | Steinruecken et al. | |
| 2015/0377654 A1 | 12/2015 | Kgrawal et al. | |

* cited by examiner

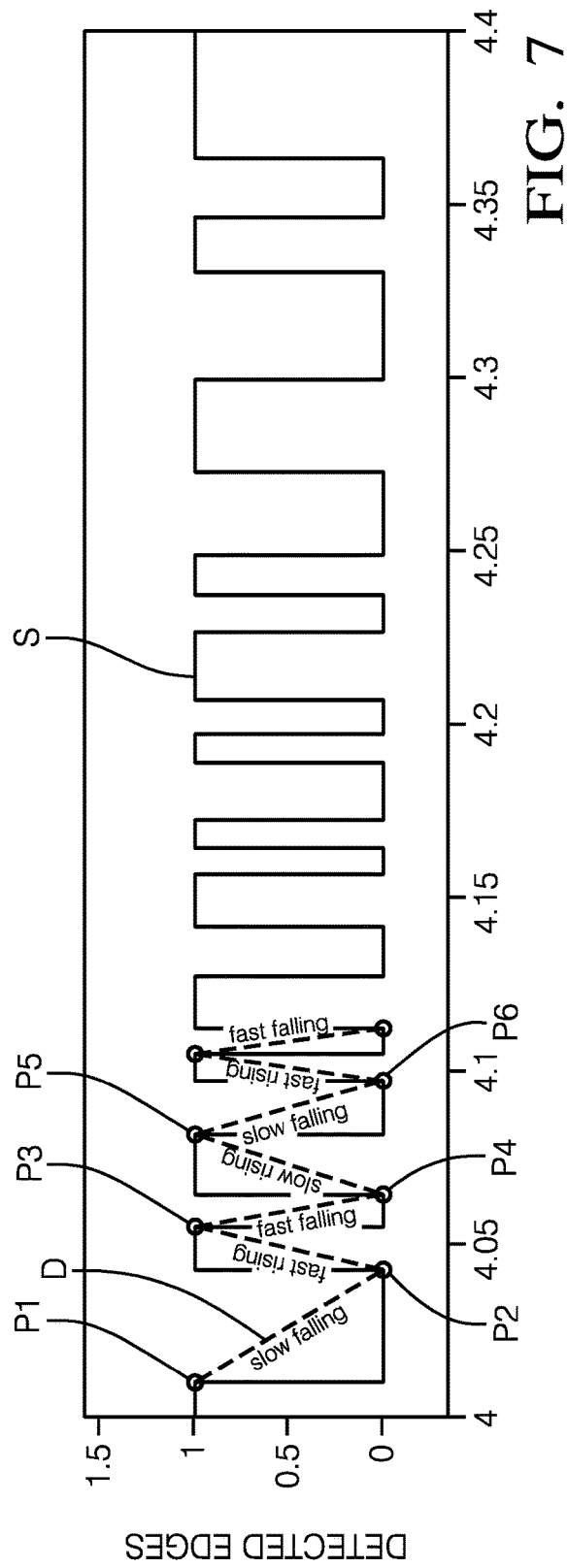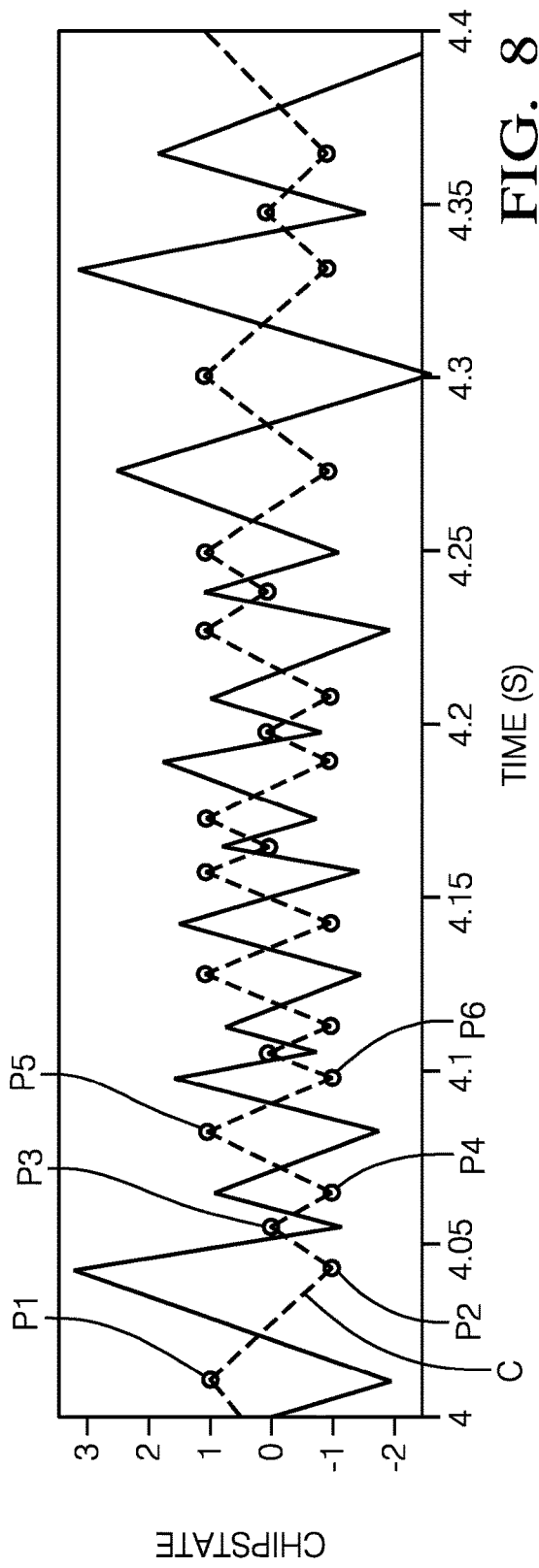

ENGINE SYNCHRONISATION MEANS

CROSS REFERENCE TO RELATED APPLICATIONS

This application is a national stage application under 35 USC 371 of PCT Application No. PCT/EP2017/071549 having an international filing date of Aug. 28, 2017, which is designated in the United States and which claimed the benefit of GB Patent Application No. 1615293.6 filed on Sep. 8, 2016, the entire disclosures of each are hereby incorporated by reference in their entirety.

TECHNICAL FIELD

The present invention relates to an engine synchronization method and to the means associated particularly a device comprising a crank-shaft phonic wheel enabling the engine position to be recognised by an engine control unit.

BACKGROUND OF THE INVENTION

An internal combustion engine provided with direct fuel injection equipment requires accurate synchronisation of said injection equipment with the engine position, defined by a crank-shaft angular position associated to a camshaft angular position. Synchronisation is the determination of the engine position by an engine control unit (ECU) and, in a typical engine, this is achieved by decoding phase information built into the camshaft and crank-shaft via toothed wheels. A first sensor delivers a first signal recording the crank-shaft angular position and, a second sensor delivers a second signal recording the camshaft angular position. The sensors delivering said signals are variable reluctance (VR) sensors, detecting ferrous features at the periphery of a wheel associated to the crank-shaft. Said wheel is provided with series of teeth and gaps interrupted by a thick tooth, equivalent to two missing gaps, with a fixed association to the Top Dead Centre (TDC) position of a particular cylinder of the engine. Another wheel associated to the camshaft is provided with few narrow teeth each with a fixed association to the TDC position of particular cylinders.

In a six-cylinder engine having a crank-shaft-to-camshaft gear ratio of 2:1, the crank-shaft wheel has fifty-four gaps or holes arranged in three groups of eighteen, each gap in the group separated by six degrees and, the camshaft wheel has seven teeth one for each cylinder and a seventh narrow tooth arranged next to one of the others, there forming a "double tooth" enabling the ECU to identify the camshaft phase.

When the engine runs, the second sensor detects the double tooth sequence on the camshaft wheel and thereby recognises the current cylinder; the gaps of the crank-shaft wheel are counted by the first sensor to finely resolve the current engine position.

An issue with such system is that the engine position is not precisely determined by the ECU until the double tooth has passed before the second sensor. This may require almost a complete camshaft revolution, equivalent to two crank-shaft revolutions, depending upon the position of the engine at standstill and, since more and more vehicles, including heavy duty vehicles, are provided with stop-start systems performing an increased number of engine starts, said variability and absolute time required before fuel can be injected to start the engine has become unacceptable.

SUMMARY OF THE INVENTION

Accordingly, it is an object of the present invention to resolve the above mentioned problems in providing means to more quickly synchronise the ECU and the engine by detecting the engine position after only thirty-six degrees rotation of the crank-shaft. More precisely, the invention is about an engine synchronisation means of an internal combustion engine having a crank-shaft and a camshaft geared together with a fixed rotation ratio. An engine position corresponds to an angular position of the crank-shaft associated to an angular position of the camshaft, the synchronisation means being adapted to have said engine position recognised by an engine control unit. Said synchronisation means comprises a crank-shaft wheel adapted to be fixed to the crank-shaft, and cooperating with a first sensor and, a camshaft wheel adapted to be fixed to the camshaft and cooperating with a second sensor, both crank-shaft and camshaft wheels being provided with peripheral features having edges and, both sensors being adapted to detect the edges of said features and to communicate to the ECU binary signals corresponding to the state of the adjacent wheels, the ECU detecting any change of state and recording said binary signals as a string of bits.

Advantageously, the features of the crank-shaft wheel are arranged as per a sequential pattern, a virtual sliding window of a specific width covering a unique set of features corresponding to a unique string of consecutive bits mapping to a unique angular position of the crank-shaft and wherein, the peripheral features of the crank-shaft wheel are arranged according to a 60-bit de Bruijn sequence using Manchester encoding.

More precisely, the features of the crank-shaft wheel are teeth separated by gaps or holes spread around a peripheral area of the wheel or the rim of a wheel and, the features of the camshaft wheel are high level sectors separated by low level sectors.

Also, said means is arranged so that a rotation of the crank-shaft by a predetermined elementary angle corresponds to rotating the crank-shaft wheel before said sliding window by said elementary angle and shifting the sliding window by a single bit, said string of bits thus identifying a new angular position of the crank-shaft.

Also, the fixed crank-shaft-to-camshaft rotation ratio sets a plurality of camshaft angular position for each single crank-shaft angular position, this raising an ambiguity on the exact engine position when determining the crank-shaft angular position, said ambiguity being resolved and the exact engine position being determined by the state of the camshaft wheel detected by the second sensor.

More precisely said crank-shaft-to-camshaft rotation ratio is 2:1 so that, to a single crank-shaft angular position corresponds two diametrically opposed camshaft angular positions, the exact engine position being precisely determined by the features of the camshaft wheel, the features of the camshaft wheel being arranged so that the second binary signal corresponding to a feature differs from the binary signal corresponding to the feature diametrically opposed.

Also, the sequential pattern according to which the features of the crank-shaft are arranged is a de Bruijn sequence.

Also, the crank-shaft wheel only comprises large features and narrow features, the large features being twice the width of the narrow features.

More precisely, the de Bruijn sequence is implemented using Manchester encoding, ensuring the presence of a feature edge every 6°, said elementary angle being 6°.

Said de Bruijn sequence is 60 bits in length, implemented using Manchester code over the circumference of the crank-shaft.

The features of the crank-shaft wheel alternate forty-five teeth with forty-five gaps.

Also, the specific width of the sliding window is 36° spanning a unique set of features corresponding to a string of 6 consecutive bits, unique with each increment of the elementary angle.

The invention further extends to an internal combustion engine provided with an engine synchronisation means as described above.

The invention further extends to a control method of such an engine, the method comprising a preparation phase performed while the engine is not yet rotating, the steps of the preparation phase being identified with letter "a" and, an operating phase executed when the engine rotates and identified with letter "b"; the preparation phase comprising the steps:

a1) recording in the ECU, the feature pattern of the crank-shaft wheel, the feature pattern of the camshaft wheel and the complete 60-bit de Bruijn sequence corresponding to one revolution of the crank-shaft and the corresponding Manchester coded representation;

a2) creating and recording a conversion table by dividing said 60-bit sequence into sixty unique 6-bit-words, each words comprising 6-consecutive-bits, each 6-bit-word corresponding to a unique crank-shaft angular position;

a3) creating and memorising an edge location table, derived by finding the angular position of each change or edge in the Manchester coded crank-wheel;

a4) recording in the ECU, the tooth pattern configuration of the camshaft wheel;

a5) identifying in the ECU, the relative alignment of the crankshaft wheel and the camshaft wheel so that their states can be used to determine the engine position;

the operating phase comprising the steps b1) recording the first signal (S16) containing tooth edge information in the transition between high level signal (S16H) and a low-level (S16L), and calculating a dynamic ratio of the interval between edges compared to the previous interval;

b2) applying a first threshold of 0.667 and a second threshold of 1.50 to classify each detected ratio as either 'fast rising', 'fast falling', 'slow rising' or 'slow falling', relative to the previous ratio;

b3) defining the integrated 'chipstate' that is first limited to integer values [−1, 0, 1] and then incremented or decremented upon each new edge by adding a value specific to the edge classification:

fast rising edges=+1,
slow rising edge=2,
slow falling edge=−2
fast falling edge=−1.

b4) extracting the underlying De Bruijn sequence by collating the non-zero chipstate values where '−1' indicates binary 'zero', and '+1' indicates binary 'one'; zero chipstates are derived from intermediate non-data bearing edges and shall be discarded.

b5) recording the data-bits obtained at step b4) into a stream and:

b6) when 6-consecutive bits are recorded; determining the crank-shaft angular position using the conversion table CT of step a2) by searching in said conversion table the same 6-data-bit word;

b7) reading the binary value detected by the second sensor;

b8) identifying in the record of step a5) the exact engine position in combining the information obtained at steps b6) and b7).

The control method further comprises a re-casting step to resolve the initial speed ambiguity, said re-casting step being performed after the recording step and before the determining step:

b9) if a half-size tooth is detected, too small to match the current Manchester pair-pattern, then re-casting previous half-portion teeth as 'large' double-size teeth and decoding again on that basis.

The control method further comprises a 3° shifting step to resolve any phase error, said shifting step being performed after the performing step and before the determining step:

b10) if a large gap (26L) or large tooth (24L) appear in an invalid sequence in the Manchester code due to very rapid deceleration of the wheel, this is naturally and automatically corrected, re-cast as a narrow gap or tooth by the limiting operation in claim 13 step (b3).

The control method further comprises the steps enabling determination of further engine position with enhanced precision, once an initial engine position is known:

c1) detecting the feature edges of the crank-shaft wheel;

c2) incrementing the crank-shaft angular position as indicated by the edge location table, this being recorded at step a3) and, thus determining the new engine position.

The control method further comprises the calculation of confidence in the De Bruijn solution thus enabling the fusion of the two sources of position information:

position update based on De Bruijn decoding as set above;
position update based on next edge in sequence as set above;

d1) confidence in the current De Bruijn position solution as set above is determined to be an integer value incremented when a correct position calculation is completed, but otherwise is reset to zero.

For the purpose of this application, the 'correct position' is defined to be the next contiguous position in the CT table shown below. Each decoded position is expected to advance the engine position by the elementary angle A and, as an example if angle A=6° then, 174° must be followed by 180°.

d2) if the De Bruijn position solution differs from the 'next edge' solution as set above, then the next edge in sequence shall be reported in preference, unless the De Bruijn confidence exceeds a chosen level, for instance 12, in which case the De Bruijn position solution shall override the position report and reset edge synchronisation.

The invention further extends to software comprising the steps of the method as described above, the software being executable when uploaded in an ECU.

The invention further extends to an engine control unit (ECU) adapted to control an internal combustion engine when executing such software.

BRIEF DESCRIPTION OF THE DRAWINGS

The present invention is now described by way of example with reference to the accompanying drawings in which:

FIGS. 7 and 8 are diagrams illustrating the analysis of the signal obtained from the synchronisation means.

DESCRIPTION OF THE PREFERRED EMBODIMENTS

An internal combustion engine 10 comprises an engine block having cylinders with inner reciprocating pistons defining compression chambers closed by an engine head, fuel being injected into said cylinders by fuel injectors that are part of a fuel injection equipment. The engine 10 has a crank-shaft transforming the linear displacements of the pistons into a rotational movement and, a camshaft rotating in the engine head and actuating valves controlling entry in the compression chambers of fresh fuel and exit of burned gases. The camshaft and the crank-shaft are geared together with a fixed ratio R, an engine position being determined by a crank-shaft angular position associated to a camshaft angular position.

The fuel injection equipment typically comprises a low pressure system that draws fuel from a low pressure tank and delivers it to a high pressure system wherein a high pressure pump pressurizes said fuel and delivers it to a common fuel rail and from there, to several fuel injectors.

Figure 1:
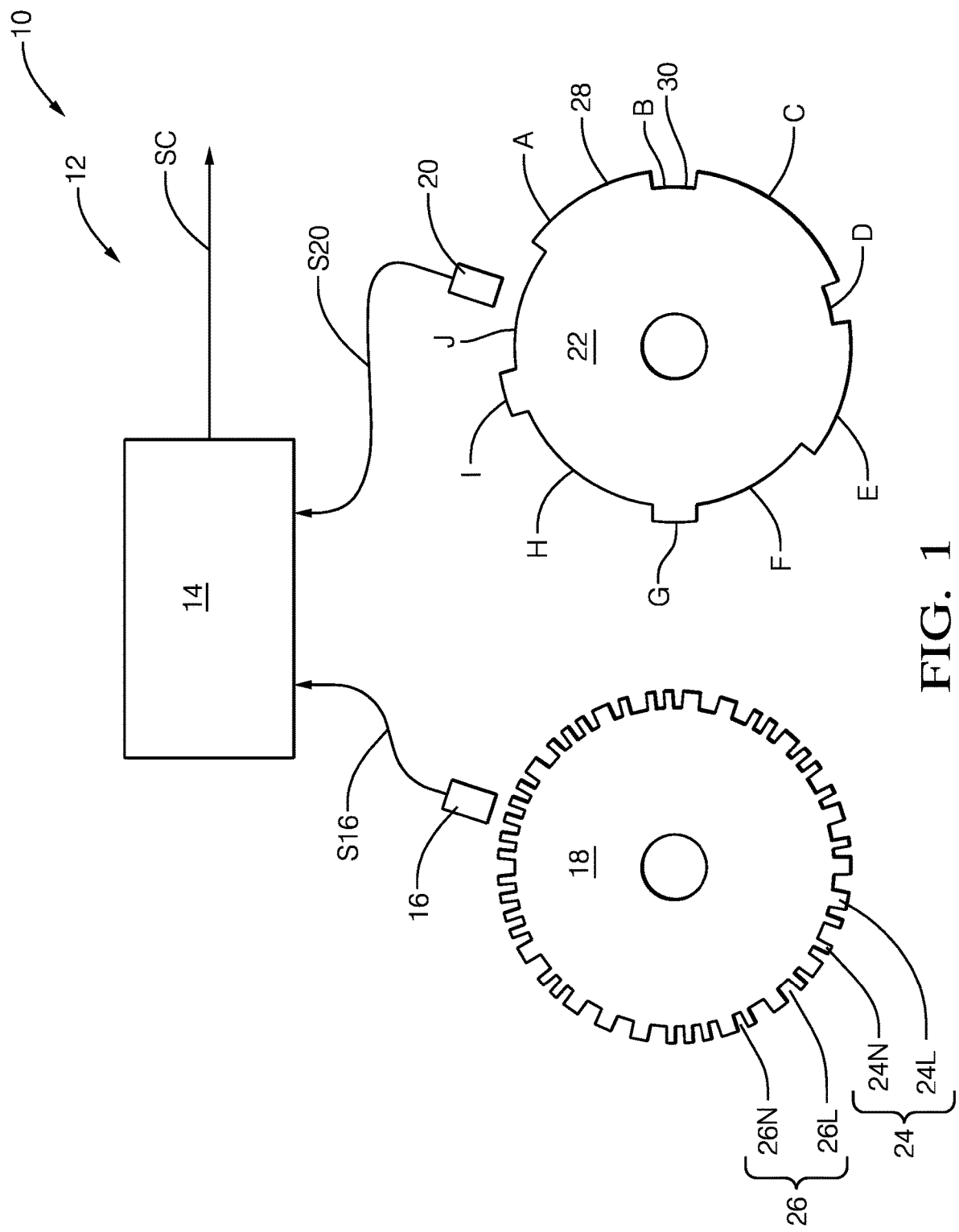
FIG. 1 is a schematic of an engine synchronisation means as per the invention.

An engine synchronisation means 12, sketched on FIG. 1, controls the engine and comprises an engine control unit 14, hereafter ECU, which receives a first signal S16 delivered by a first sensor 16 that cooperates with a crank-shaft wheel 18 fixed to the crank-shaft and also, a second signal S20 delivered by a second sensor 20 that cooperates with a camshaft wheel 22 fixed to the camshaft. Based on said signals S16, S20 the ECU 14 precisely determines the engine position, defined by a crank-shaft angular position associated to a camshaft angular position, and it delivers command signals SC to the fuel injection equipment as required to satisfy the driver demand in term of torque. Said command signals SC comprise signals sent to the high-pressure pump metering valve and also to the injectors.

The first sensor 16 is typically a Hall Effect sensor that detects teeth 24, and gaps 26 between said teeth 24, provided on the circumference of the crank-shaft wheel 18. In fact, the first sensor 16 indicates changes between a high level, that is a tooth 24 and, a low level implemented by a gap 26. The first signal S16 is a binary signal that commutes consequently between a high level signal S16H and a low level signal S16L.

Similarly, although the wheels differ from each other, the second sensor 20 is also typically a Hall Effect sensor that detects alternating high level sectors 28 and low level sectors 30, provided on the circumference of the camshaft wheel 22, the second signal S20 also being a binary signal commuting between a high level signal S20H and a low level signal S20L. In reference to the figures, it is visible that the feature identified providing a high level signal can be identified as a "tooth" on the crank-shaft wheel but a "sector" seems more appropriate to designate the feature of the camshaft wheel.

Alternatively, the two sensors could use other technology than the Hall Effect provided they deliver distinctive signals for features such as teeth and gaps or high level and low level sectors.

More precisely, the camshaft wheel 22 has five protruding sectors 28, or high level sectors, identified on FIG. 1 with letters A, C, E, G and I alternating with five low level sectors 30, identified on FIG. 1 with letters B, D, F, H, J. Said ten sectors have different width, or cover different angles in respect of the fact that, diametrically opposed to a high sector 28 is a low sector 30 of the same width or the same angular span. For instance, opposite to the high and large sector identified 28A is the low and large sector 28F and, opposite to the high and narrow sector identified 28G is the low and narrow sector 28B, said opposite sectors having the same angular width. In operation when the camshaft rotates, the second sensor 20 senses the proximity of the camshaft wheel 22 and delivers to the ECU 14 said binary second signal S20 comprising the high level signal S20H when a high sector 28A, C, E, G, I, passes in front the second sensor 20 and, the low level signal S20L when a low sector 30B, D, F, H, J, passes in front the second sensor 20.

The crank-shaft wheel 18 is provided with forty-five (45) teeth 24 and the same number of gaps 26 and, the teeth 24 are either large teeth 24L or narrow teeth 24N and, between two consecutive teeth, the gap 26 is either a large gap 26L or a narrow gap 26N. Narrow features, teeth 24N or gaps 26N, have an angular width of 3° and, large features, teeth 24L or gaps 26L, are twice that size having an angular width of 6°.

Figure 5:
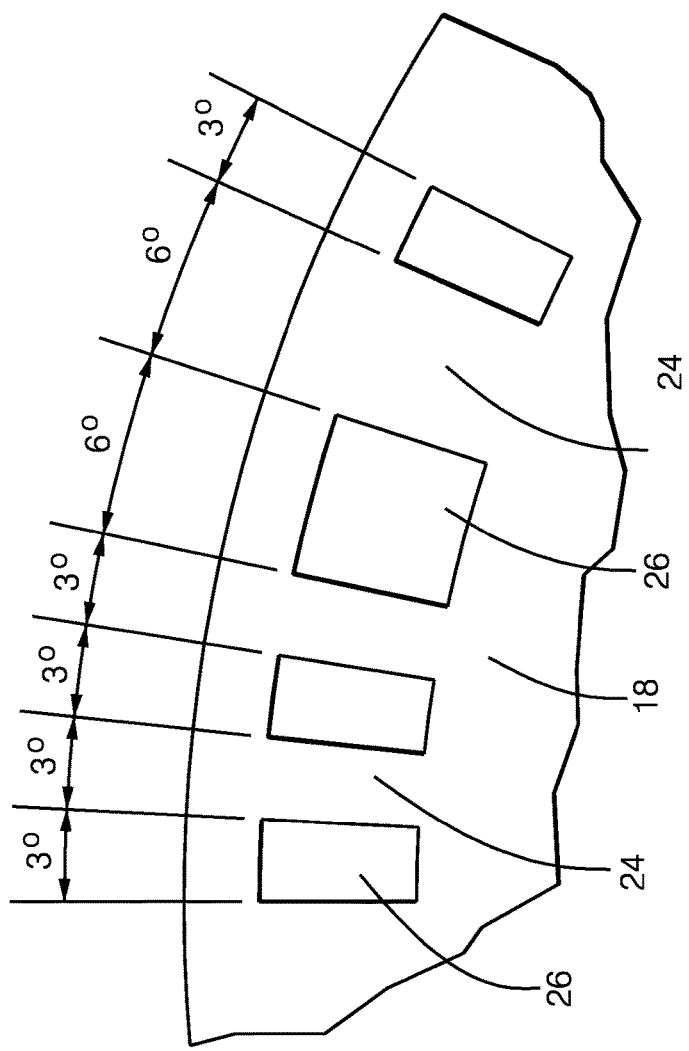
FIG. 5 is a detail of second embodiment of the crank-shaft wheel.

In an alternative partially sketched on FIG. 5, the teeth 24 and gaps 26 are replaced by holes, equivalent to gaps, arranged in the peripheral region of a disc, "small" holes have a width of 3°, and "large" holes have a width of 6°. In this case, the first sensor 16 detects said holes or counts the edges of said holes. On FIG. 5 the holes are trapezoidal but any other shape such as rectangular, circular, oblong, is possible as long as the 6° large angular width and 3° narrow angular width is respected. In another alternative embodiment sketched on FIG. 6, said features are cylindrical holes radially drilled on the rim of the engine flywheel that typically has about 50 cm diameter and 3 cm width and, in the rim are drilled holes of large diameter having a 6° width and small holes having just half that size. For clarity and simplification purposes, the description proceeds with "teeth" and "gaps" without limiting the invention to this embodiment, the scope of the invention covering all other detectable "features" enabling generation of binary signals.

In operation, when the crank-shaft rotates, the first sensor 16 senses the proximity of the crank-shaft wheel 18 and delivers to the ECU 14 said binary first signal S16 comprising the high level S16H when a tooth 24 passes in front the first sensor 16 and, the low level S16L when a gap 26 passes in front the first sensor 16. Furthermore, the levels of the first signal commutes from high to low, or low to high, when a tooth or gap edge passes before the first sensor 16, these commutations enabling the counting of edges.

To exactly determine the engine position, the forty-five teeth 24 and gaps 26 of the crank-shaft wheel 18 are arranged according to a 60-bit de Bruijn sequence using Manchester encoding, a pattern that is recorded in the ECU 14. This pattern ensures that the bit stream corresponding to the binary first signal S16 recorded during a revolution of the crank-shaft comprises 60 bits. Every 36° sector has a unique pattern and, every 6° is an edge, either rising when passing from a gap to a tooth, or falling when passing from a tooth to a gap. A crank-shaft angular position is identified by a 6-consecutive-bit-data-word extracted from the complete 60-bit string, said 6-bit-data-word being unique to a single angular position, the 6° angle representing an elementary angle A of a single bit within the 60-bit stream.

The de Bruijn sequence is a mathematical sequence of length kn such that every permutation of the alphabet (size k) with length "n" exists as a continuous sub-range within the sequence. Each consecutive sub-range or string of length "n" within the sequence is unique, never repeated. This property can be preserved even if the sequence is truncated or modified to a reduced length for instance from 64 bits (k=2, n=6) to 60 bits.

A large number of such de Bruijn sequences can be generated, each satisfying this requirement. For instance, the following binary strings are four examples of 60-bit de Bruijn sequences:

B1—000000100001100010100011100100101100110100111101010111011111;

B2—000001110011000101001111100001001000110111101101011001011101;

B3—000000110101011100100011111101000010010100111011000101101111;

B4—000000111101101000010101001110010010111010110001000110111111.

Figure 4:
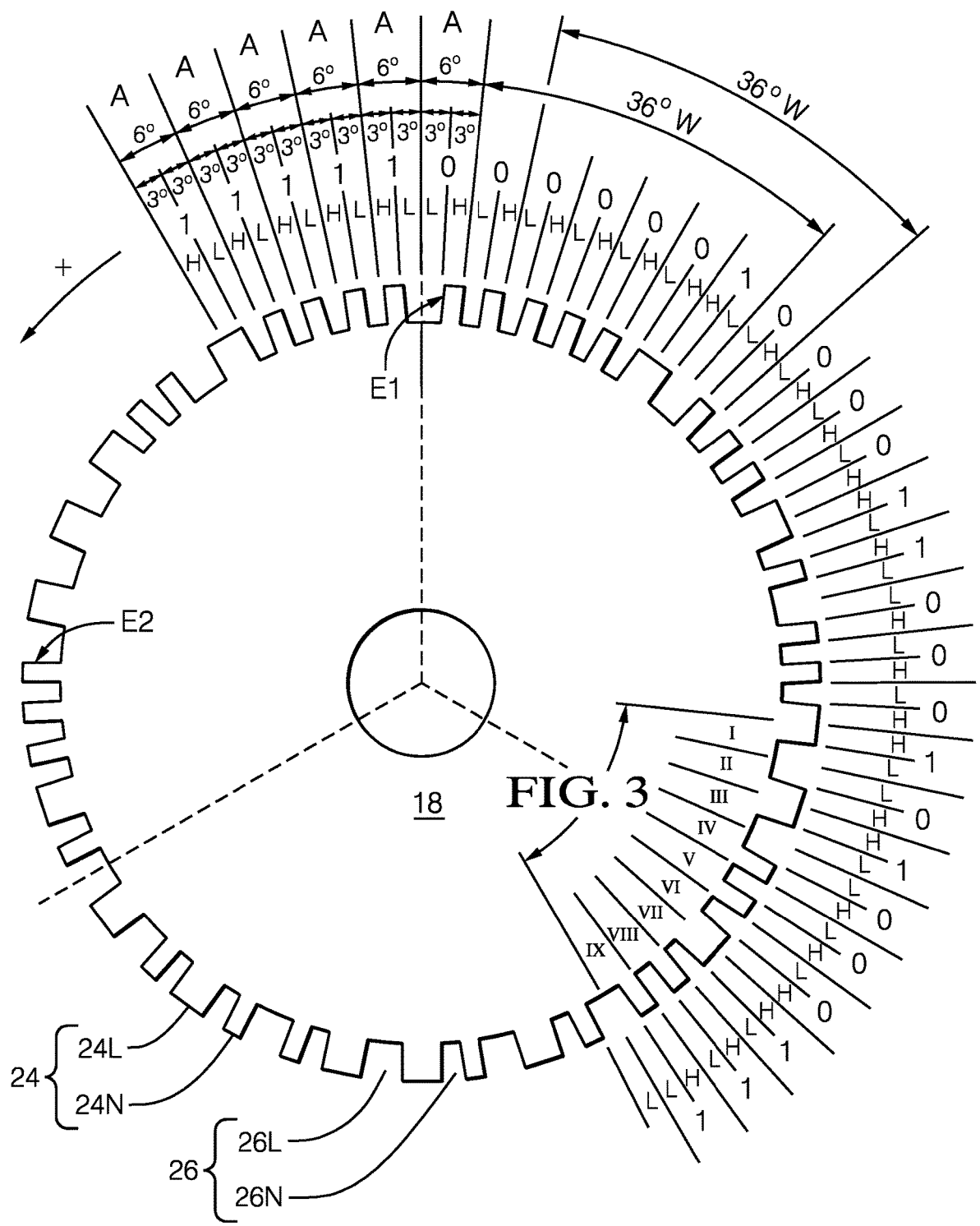
FIG. 4 is a magnified representation of a crank-shaft wheel of the means of FIGS. 1 and 2.

The first sequence, identified B1, is used on the example crank-shaft wheel 18 of FIG. 4, the beginning of said B1 sequence "000000100001 . . . " being indicated along with the high S16H or low S16L level of the first signal S16. Taking said B1 sequence as an example, the crank-shaft angular position is identified as per 6-bit-data-word differing from the previous by one bit as indicated in the conversion table CT below:

| | |
|---|---|
| 111110 | = 0° |
| 111100 | = 6° |
| 111000 | = 12° |
| 110000 | = 18° |
| 100000 | = 24° |
| 000000 | = 30° |
| 000001 | = 36° |
| 000010 | = 42° |
| 000100 | = 48° |
| 001000 | = 54° |
| 010000 | = 60° |
| 100001 | = 66° |
| 000011 | = 72° |
| 000110 | = 78° |
| 001100 | = 84° |
| 011000 | = 90° |
| 110001 | = 96° |
| 100010 | = 102° |
| 000101 | = 108° |
| 001010 | = 114° |
| 010100 | = 120° |
| 101000 | = 126° |
| 010001 | = 132° |
| 100011 | = 138° |
| 000111 | = 144° |
| 001110 | = 150° |
| 011100 | = 156° |
| 111001 | = 162° |
| 110010 | = 168° |
| 100100 | = 174° |
| 001001 | = 180° |
| 010010 | = 186° |
| 100101 | = 192° |
| 001011 | = 198° |
| 010110 | = 204° |
| 101100 | = 210° |
| 011001 | = 216° |
| 110011 | = 222° |
| 100110 | = 228° |
| 001101 | = 234° |
| 011010 | = 240° |
| 110100 | = 246° |
| 101001 | = 252° |
| 010011 | = 258° |
| 100111 | = 264° |
| 001111 | = 270° |
| 011110 | = 276° |
| 111101 | = 282° |
| 111010 | = 288° |
| 110101 | = 294° |
| 101010 | = 300° |
| 010101 | = 306° |
| 101011 | = 312° |
| 010111 | = 318° |
| 101110 | = 324° |
| 011101 | = 330° |
| 111011 | = 336° |
| 110111 | = 342° |
| 101111 | = 348° |
| 011111 | = 354° |

Each 6-bit data word corresponds to an angle of 36° and, the identification of the 6-bit data word is done moving a 36° sliding window W over the 60-bit sequence. The window W is a virtual window. As shown on FIGS. 3 and 4, each 1-bit increment records a new data bit at an end of the word and, removes a bit at the other end.

Also, the crank-shaft wheel 18 having forty-five teeth, in a revolution of said wheel 18 the first sensor 16 sees 90 edges and delivers a genuine signal that alternates forty-five high level S16H with forty-five low level S16L all being recorded in the ECU 14. The transformation of said genuine Manchester-coded first signal S16 into a 60-bit data sequence is explained in reference to the diagram of FIG. 3 and the wheel of FIG. 4 where the angular section corresponding to FIG. 3 is indicated.

Figure 3:
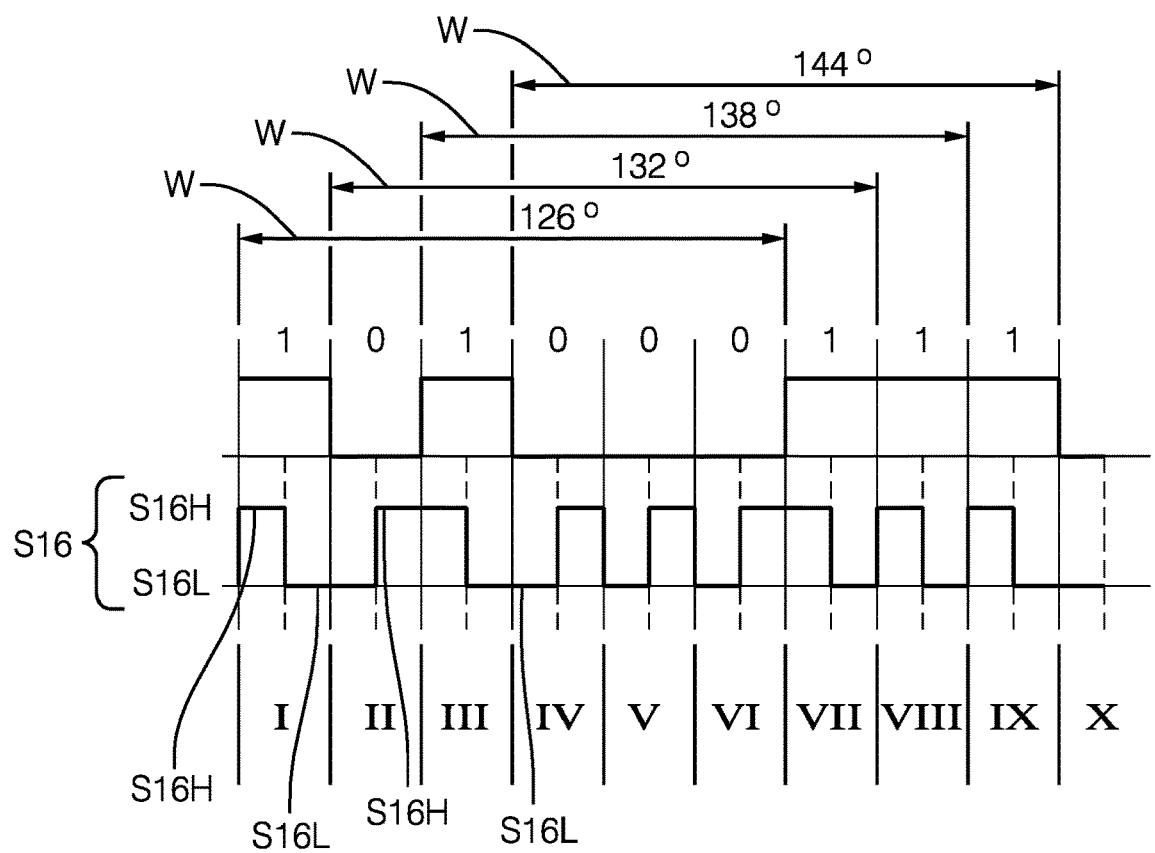
FIG. 3 is an encoding diagram corresponding to the crank-shaft wheel of FIG. 2.

In FIG. 3, the top graph is the de Bruijn sequence and the bottom graph is the physical wheel pattern generated using Manchester encoding, and the corresponding genuine high-low first signal S16.

A 360° revolution of the crank-shaft is divided in sixty portions each being equal to the elementary angle A of 6°. During a revolution of the crank-shaft each 6° portion, identified in FIG. 3 by sectors having roman numbers I to IX, records two different signal states in each half-portion, a high level S16H and a low level S16L, the order of these half-portion states within the genuine signal determining the data bit of said 6° sector. Each of said halves genuine signals corresponds to 3°, half the elementary angle A. When the first half of genuine signal is a high level S16H and the second half genuine signal is a low level S16L, as it is in the portions I, III, VII, VIII, IX, the data bit is "1" and, when the first half genuine signal is a low S16L and the second half genuine signal is a high S16H as in the portion indicated II, IV, V, VI, then the data bit is "0".

The engine position cannot be decoded until an engine speed ambiguity is resolved, that is to say teeth 24 passing the first sensor 16 can be classified as 'large' 24L or 'small' 24N. Considering that the engine is rotating initially with varying and unknown speed, it is impossible to confidently classify features passing the first sensor 16 until features of both sizes have been observed (or in the special case arising near the beginning of the de Bruijn sequence B1, nine consecutive edges with the same interval). While said ambiguity in speed persists (for up to 42° in the worst case in sequence B1) the recording of tooth intervals for Manchester decoding begins with the assumption that the first features are 'small' 24N, 26N, since they are more numerous than 'large' features. If this assumption is proved incorrect by the observation of a 'half-sized' tooth, then the recorded sequence in memory is corrected retrospectively.

When starting the engine from an unknown position, an initial ambiguous recording of the first genuine signal S16, either high or low, is interpreted as being the first half of a 6° portion, the second genuine signal is then the second half, the third genuine signal is the first half of the next second 6° portion, and so on until a feature of a different size is detected by the first sensor 16, for example one large tooth 24L followed by a small gap 26N, or a small gap 26N followed by a large tooth 24L.

If large features are recorded spanning the second half and first half of two adjacent 6° portions, for instance a large and low level S16L recording between the portions I and II, or between III and IV or, a large and high level S16H recording between the sectors II and III, or between VI and VII, the phase assumption is validated and Manchester decoding continues. On the contrary, a phase error in Manchester decoding can occur and will be detected if said two identical half signals record within the same 6° portion. The ECU understands then that the recording is offset in phase by 3°. The bit string is then automatically synchronised by shifting all the records by 3°, or half a sector, and the previous recordings corrected retrospectively.

Figure 2:
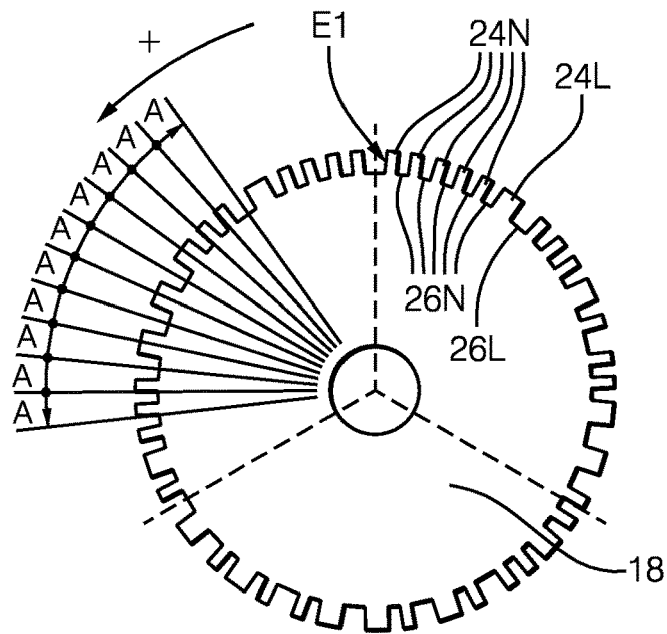
FIG. 2 is a representation of a crank-shaft wheel of the means of FIG. 1.

For instance, in reference to FIGS. 2 and 4, rotating the crank-shaft wheel in the anticlockwise direction as indicated by the arrow "+", and starting to record at the tooth edge indicated E1, the first sensor 16 will see five narrow teeth 24N, each followed by a narrow gap 26N then, a large tooth 24L and a large gap 26L. The corresponding genuine signal is "HL, HL, HL, HL, HL, HH, LL" corresponding to an undetermined bit-word that starts with the string 11111x. The sequence HH is not valid within the Manchester code and indicates a 3° offset and that a shift is required. The genuine signal recorded is automatically and retrospectively shifted by the ECU 14 and, the Manchester halves are re-paired "-H, LH, LH, LH, LH, LH, HL, L-" corresponding to the 6-data-bit-word "000001" now interpreted as 36°, according to the above conversion table CT.

Figure 6:
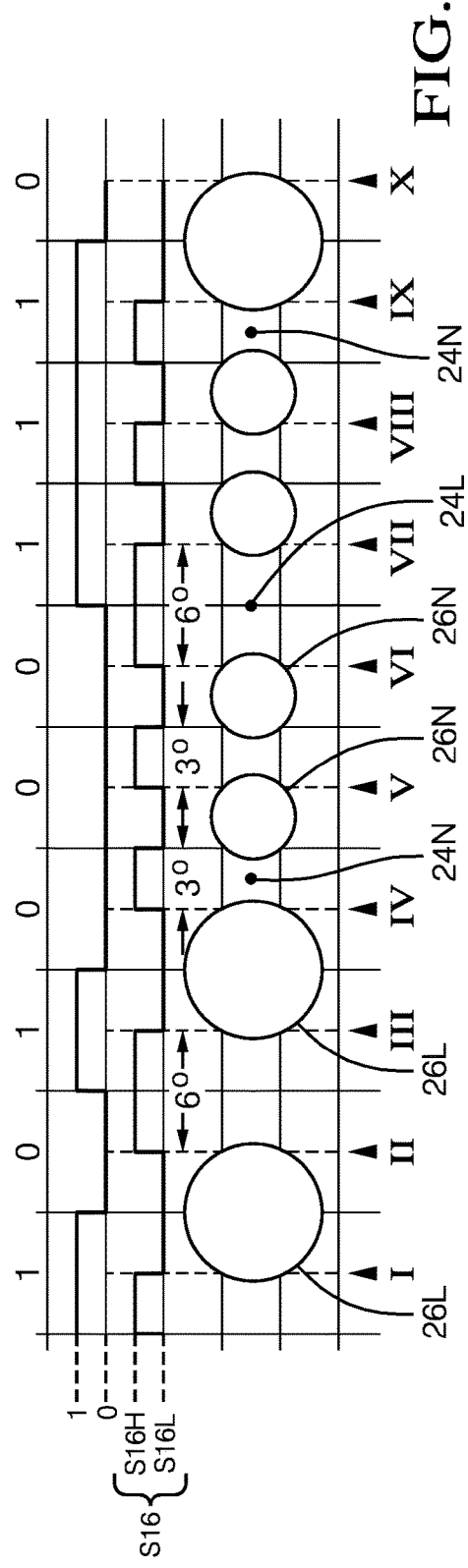
FIG. 6 is similar to FIG. 3 presenting an encoding diagram in relation to radial holes arranged in the rim of a flywheel.

Also, FIG. 6 presents the same data as FIG. 3, from the same part of the sequence B1 and with the same Manchester code but implemented by holes radially drilled in the rim of the flywheel of the engine. The holes are cylindrical and are either large holes 26L or smaller holes 26N. The large holes 26L have a diameter approximately twice the diameter of a small hole 26N, said large diameter presenting to the sensor an angular width of 6°. The intervals between said holes (analogous to teeth) are either large intervals 24L, of similar 6° width, or small intervals 24N having a 3° width. When facing a hole 26, the first sensor 16 delivers a low level signal S16L and, when facing an interval, a high level signal S16H is delivered.

Thanks to the pattern arrangement as per a de Bruijn sequence implemented using Manchester encoding the crank-shaft angular position is determined typically after a rotational angle of 36° of the crank-shaft and always within 42° in the case of sequence B1. 42° is the unlikely worst case delay occurring if the engine begins rotation at exactly 270° prior to several consecutive 'large' features, identified on FIG. 4 with edge E2, which will delay the disambiguation of engine speed by an additional tooth. In the prior art, the delay during synchronisation extends much further and may require almost two revolutions of the crank-shaft. Determining the engine position requires to know the angular position of the crank-shaft and also the angular position of the camshaft. The rotation ratio R raises another ambiguity in said determination since several camshaft positions correspond to a single crank-shaft position. For instance, in the typical case of a ratio R of 2:1 meaning that the crank-shaft RPM is twice the camshaft RPM, to each crank-shaft angular position corresponds two diametrically opposed camshaft positions, the engine position remaining undetermined. The second signal S20 sent to the ECU 14 by the second sensor 20 enables resolution of said ambiguity. As shown in the exemplary embodiment of FIG. 1, the camshaft wheel 22 has diametrically opposed high level 28 and low level 30 sectors so, the engine position is precisely known without any further delay: as soon as the crank-shaft position is determined thanks to the first signal S16, the second signal S20 indicates the engine position.

Determining the initial engine position, meaning the "first" engine position when the engine starts rotating from an unknown position, requires interpretation of the first 6-data-bit-word read in the sliding window W and also of the second signal S20. Once said initial engine position is known, the next position can be determined with the same method of interpreting the next 6-bit-word or, more simply, by counting the tooth edges passing by the first sensor S16. Indeed, the tooth pattern of the crank-shaft wheel 18 being recorded, once the initial engine position is known, simply counting the edges enables finer increments to the angular position, by 3° or 6°.

In an alternative embodiment not represented, the crank-shaft position is directly determined thanks to a crank-shaft wheel provided with sixty teeth alternating with sixty gaps all arranged as per a de Bruijn sequence but without using the Manchester encoding. In this case there is provided a rising tooth edge exactly every 6°, with the de Bruijn sequence implemented by tooth width coding using either "Narrow" 2° or "Large" 4° teeth separated by complementary 4° or 2° gaps. The de Bruijn data is decoded simply by comparing the relative size of the tooth and the gap in each 6° interval: if the tooth is wider than the gap then a '1' is decoded, and conversely if the tooth is narrower than the gap then '0' is decoded. Each new bit value is appended until a 6-bit sequence is recorded and the engine position can be determined as before using the above conversion table CT.

Although manufacturing sixty teeth, or any type if feature, is more complex than manufacturing only forty-five and, it involves a minimum feature size (2°) that is smaller than the previous scheme (3°), said direct tooth-width coding without Manchester encoding offers some advantage in that crank-speed ambiguity is resolved within a single 6° portion by observation of two features of different size, due to the regular positioning of the rising edge of every tooth. Then, engine position can be resolved more easily (without Manchester encoding) and also within 36°.

Another significant advantage of using edge-counting as the primary method (following initial engine position determination) is that robustness to engine speed variation is improved, since the ECU 14 will use directly edges detected by S16 (changes from "0" to "1" or vice versa) to increment the engine position according to the ninety edges (corresponding to FIG. 4) known in a software 40 as edge location table ET below, where the first edge at 3° is identified as E1 and the wheel 18 rotating in the anticlockwise direction following the "+" arrow:

[3° 6° 9° 12° 15° 18° 21° 24° 27° 30° 33° 39° 45° 48° 51° 54° 57° 60° 63° 69° 72° 75° 81° 84° 87° 90° 93° 99° 105° 111° 117° 120° 123° 126° 129° 135° 138° 141° 144° 147° 153° 156° 159° 165° 171° 174° 177° 183° 189° 195° 198° 201° 207° 210° 213° 219° 222° 225° 231° 237° 243° 246° 249° 255° 258° 261° 264° 267° 270° 273° 279° 285° 291° 297° 303° 309° 312° 315° 318° 321° 327° 333° 336° 339° 342° 345° 348° 351° 354° 357°]

De Bruijn decoding will continue post-synchronisation for engine position monitoring; to establish confidence in the position solution and detect if an edge is missed.

The software 40 uploaded in the electronic ECU 14 executes a control method 100 for an engine 10 provided with the synchronization means 12 as previously described is now presented. The steps of the method 100 are recorded in the software 40 and, the method 100 comprises a preparation phase performed while the engine is not yet rotating, the steps of the preparation phase being identified with letter "a" and, an operating phase executed when the engine rotates and identified with letter "b".

The steps of the preparation phase are:

a1) recording 110 in the ECU 14, the tooth, gap, feature pattern of the crank-shaft wheel 18 and, the sector pattern of the camshaft wheel 22 and, the complete 60 bits de Bruijn sequence corresponding to one revolution of the crank-shaft wheel and the corresponding 120-element Manchester representation;

a2) creating and recording 112 in the ECU 14 the conversion table CT, derived by dividing said 60-bit sequence into sixty unique 6-bit-words, each comprising 6 consecutive bits, each 6-bit-word corresponding to a unique and well identified crank-shaft angular position;

a3) creating and memorising 113 the edge location table ET, derived by finding the angular position of each change or edge in the Manchester coded crank-wheel;

a4) recording 114 in the ECU 14, the tooth pattern configuration of the camshaft wheel;

a5) identifying 116 in the ECU 14, the relative alignment of the crankshaft wheel and the camshaft wheel so that their states can be used to determine the engine position.

After said preparation phase, the ECU 14 is adapted to match any engine positions with the first S16 and second S20 signals received.

The method 100 further comprises the operating phase wherein the engine position is used to synchronise the fuel injection equipment with said engine 10, this in order to ensure fuel injection at the required pressure, the required quantity, the required time, for the required duration. The initial steps of the operating phase are executed when the engine 10 starts rotating.

b1) recording 120 the first signal S16 received and coupling in pairs the high S16H and low S16L levels of said first signal then, translating each pair into one data-bit according to the Manchester decoding principle, each pair comprising both a high level signal S16H and a low level signal S16L;

b2) assembling 122 the data-bits obtained at step b1) into a stream;

b3) if a half-size tooth is detected, too small to match the current Manchester pair-pattern, then re-casting (123) previous half-portion teeth as 'large' double-size teeth and decoding again on that basis. The new smaller tooth width will be interpreted as the elementary angle (6°).

b4) if within a pair are recorded two identical signals, either high or low levels, shifting 124 the complete stream by half a bit signal so that said identical signals are no longer paired together;

b5) when 6-consecutive bits are recorded; determining 126 the crank-shaft angular position using the conversion table CT of step a2) by searching in said conversion table CT the same 6-data-bit word;

b6) reading 128 the binary value detected by the second sensor 20;

b7) identifying 130 in the record of step a5) the exact engine position by combining the information obtained at steps b5) and b6).

Any subsequent engine position is determined by induction from the previous position. This is simply done by counting the edges of the crank-shaft wheel 18 and, the tooth pattern being known by the ECU 14, each edge corresponding to a known increment of 3° or 6° as indicated by the edge location table ET, the new engine position being directly determined by incrementing the previous position by said tooth edge angle. The corresponding method steps are:

c1) detecting 132 the edges of the crank-shaft wheel 18;

c2) starting from a known engine position and incrementing 134 the crank-shaft angular position as indicated by the edge location table ET, this being recorded at step a3) and, thus determining the new engine position.

As part of the induction method, determining any new engine position by an angular increment of the previous engine position may require regular checks. A plausibility check step may then be inserted within the induction steps and be performed regularly. Said plausibility check compares the incremented engine position with a complete new de Bruijn determination, performed as in the initial steps, by recording the corresponding 6-bit-word that differs from the previous 6-bit-word by only one bit and, by executing similar method steps as b1) to b7).

Alternatively to the induction method, a subsequent engine position can be determined via complete new de Bruijn determination, performed as in the initial steps, by recording the corresponding 6-bit-word that differs from the previous 6-bit-word by only one bit and, by executing similar method steps as b1) to b7).

Normally the 3° shift is performed only once, if needed, during the determination of the initial position, so the step b4) is either not performed, if the recording starts correctly or, is performed once if a shift is needed. Once the Manchester code stream is correctly interpreted, either directly or following a 3° shift, any further recording is done correctly without need of such b4) realignment step. Confidence in the correct phase of the Manchester code stream is afforded by successive contiguous angular position solutions following de Bruijn decoding or checking e.g. 6°, 12°, 18° and so on.

Determination of the engine position is key to synchronising the fuel injection system, ensuring that the pump operates on the correct volume of fuel and said fuel is injected into correct cylinder with optimum timing.

The Manchester decoding is further detailed in reference to FIGS. 7 and 8. It illustrates the advantage of the decoding method in robustness to some types of error or ambiguities. This involves an integer identified as a 'Chipstate', limited to the range of integers [−1, 0, +1] but modified by incrementing and decrementing either [1, 2, −1 or −2]:

fast rising edges=+1,
slow rising edge=2,
slow falling edge=−2
fast falling edge=−1.

FIG. 7 plots the edges detected by the sensor. Because the wheel rotational speed varies, the time duration between consecutive edges distant by the same angle varies. The genuine detection of the edges by the sensor is illustrated by the 'square line' 'S' which is an alternation of rising and falling edges between two levels 0 or 1.

The duration of each edge interval is illustrated by the broken line 'D', each segment of said line 'D' joining the first points of each edge transition.

For instance:

the first transition P1-P2, joins the first corner point of the falling edge (point P1—level '1') to the first corner point of the second edge (point P2—level '0');

the following second transition joins said first corner point of the second edge (point P2—level '0') to the first corner point of the third edge (point P3—level '1');

the following third transition joins said first corner point of the third edge (point P3—level '1') to the first corner point of the fourth edge (point P4—level '0'), etc.

This example goes on with the following segments and with points P5, P6, P7, P8 . . . .

Any transition going from level 1 to level 0 is identified as a 'falling edge' passing from a tooth to a gap and, any transition going from level 0 to level 1 is identified as a 'rising edge' passing from a gap to a tooth, the line 'D' showing the alternation of 'rising' and 'falling' edges.

In a first interpretation it is assumed that FIG. 7 is taken while the wheel rotates, the method knowing already in which angular position the wheel is oriented. The analysis is applied as follows:

The first transition P1-P2 is a 'falling edge' and, its interval is long enough to be identified as a long gap 26L.

The second transition P2-P3 is a 'fast rising edge' identified as a narrow tooth 24N.

The third transition P3-P4 is a 'fast falling edge' identified as a narrow gap 26N.

The fourth transition P4-P5 is a 'slow rising edge' identified as a large tooth 24L.

Interesting enough, said fourth transition P4-P5 'slow' is obviously shorter than the first transition P1-P2 'slow' although both identify large features (tooth or gap) of 6° angle. Said duration difference is due to an acceleration of the wheel rotational speed and, thanks to the following steps of the method, both transitions are identified as large features tooth 24L and gap 26L.

FIG. 8 illustrates this on the same time scale as FIG. 7, by identifying the 'Chipstate' for each of the points P1, P2, P3 . . . .

The first transition P1-P2 starts from a '1' and it is a 'slow falling' edge so '−2' is added and the Chipstate at point P2 becomes −1 (1−2=−1).

The second transition P2-P3 starts from said '−1' and, it is a 'fast rising' edge so '+1' is added and the Chipstate at point P3 becomes 0 (−1+1=0).

The third transition P3-P4 starts from said '0' and it is a 'fast falling' edge so '−1' is added and the Chipstate at point P4 becomes −1 (0−1=−1).

The fourth transition P4-P5 starts from said '−1'. Its interval is twice the interval of the previous third transition P3-P4 and, within 3° or 6° angle of rotation, an acceleration doubling the speed or a deceleration dividing the speed by two is not plausible, in comparison to the fast third transition, said fourth transition P4-P5 must be a 'slow rising' edge and, a value '+2' is added, the chipstate at point P5 is therefore +1 (−1+2=+1).

Solving the ambiguity of over-acceleration/deceleration is done by applying a first threshold of 0.667, and a second threshold of 1.50, to classify each detected ratio as either 'fast' or 'slow', relative to the previous ratio. In the instance of the fourth transition P4-P5 which duration is twice the interval of the third transition P3-P4, the ratio of 2 being outside the limits 0.667-1.5, the two transitions P3-P4 and P4-P5 must be classified differently and, the third transition being a 'fast', the fourth transition must be a 'slow'.

The sequence of Chipstate values, explained above and continued by reading FIG. 8, on the broken line identified C, is:

1 −1 0 −1+1 −1 0 −1+1 −1+1 0+1 −1 0 −1+1 0+1 −1+1 −1 0 −1.

From said Chipstate sequence is extracted the De Bruijn sequence in which the '1' are identified as '1', the '0' are ignored and, the '−1' are identified as '0'. The corresponding De Bruijn sequence is then:

1 0 0 1 0 0 1 0 1 1 0 0 1 1 0 1 0 0.

Each 6-bit-data-word of said De Bruijn sequence corresponds to an angle of 36° and, the identification of the 6-bit data word is done moving a 36° sliding window W over the 60-bit sequence, said window W being a virtual window. As shown on FIGS. 3 and 4, each 1-bit increment records a new data bit at an end of the word and, removes a bit at the other end.

The above paragraphs assumes a first interpretation of FIG. 7 wherein the wheel rotates already.

A second interpretation illustrates a benefit of the method in resolving initial ambiguities. This interpretation is done considering that FIG. 7 is taken when the wheel just starts to rotate, the first transition P1-P2 being the first transition read by the sensor and, the method not knowing in which angular position the wheel is.

In this case, not knowing if the first transition is linked to a narrow feature 24N, 26N or to a large feature 24L, 26L, the method arbitrarily chooses one of the two classifications.

A first choice is a 'slow' classification. The first transition P1-P2 is interpreted as a 'slow falling edge'.

The duration of the following second transition P2-P3 is about a third of the interval of the first transition. The engine cannot accelerate to this level, typically the acceleration/deceleration being limited by the rotating mass. Therefore, said very short one-third interval mandatory means that the feature read by the sensor is narrower than the initial feature of the first transition. Said second transition P2-P3 is therefore identified as a 'fast rising edge' confirming that the first transition P1-P2 was a 'slow falling edge'.

Solving the ambiguity of over-acceleration/deceleration the method is done similarly as detailed above, by applying a first threshold of 0.667, and a second threshold of 1.50, to classify each detected ratio as either 'fast' or 'slow', relative to the previous ratio. The second transition having an interval that is a third than the first transition, and 1.3 being outside the limits 0.667-1.50, said second transition must be classified differently as the first segment. The first transition being a 'slow' the second transition with a much shorter duration is a 'fast'.

The second possible choice is 'fast' classification. The first transition P1-P2 is interpreted as a 'fast falling edge'. The transition interval P2-P3 is about one third of the interval of the first transition. This means that the engine would have an implausible rate of acceleration, multiplying the rotational speed by 3 within an angular span of 6°. In fact, the acceleration/deceleration are relatively slow and, over an angle of 6° the speed is almost constant. Therefore, said very short one-third interval means that the feature read by the sensor is narrower than the initial feature of the first transition. Said second transition P2-P3 is therefore identified as a 'fast rising edge' and, the first transition P1-P2 is corrected from 'fast' to 'slow'.

In said second classification choice, in applying said first threshold of 0.667, and second threshold of 1.50, the first transition P1-P2 which interval is three time the interval of the second transition P2-P3, the ratio 1/3 being outside the limits 0.667-1.5, the two transition P1-P2 and P2-P3 must be classified differently. The first transition being arbitrary classified as 'fast', the second transition becomes an 'ultra-fast' which is not possible, the first transition being then re-classified as 'slow' for the second transition to be classified as a 'fast'.

LIST OF REFERENCES

R ratio
S16 first signal
S16H high level first signal
S16L low level first signal
S20 second signal
SC command signal CT conversion table
A elementary angle
W sliding window
10 engine
12 engine synchronization means
14 Engine control Unit—ECU
16 first sensor
18 crank-shaft wheel
20 second sensor
22 camshaft wheel
24 feature—tooth on crank-shaft wheel
24L large tooth
24N narrow tooth
26 feature—gap on crank-shaft wheel
26L large gap
26N narrow gap
28 feature—high level sector on camshaft wheel
A, C, E, G, I
30 feature—low level sector on camshaft wheel
B, D, F, H, J
40 software
100 control method
110 memorizing method step
112 creating method step
113 creating and memorising
114 recording method step
116 identifying method step
120 recording method step
122 recording method step
123 re-casting
124 shifting method step
126 determining method step
128 reading method step
130 identifying method step
132 detecting method step
134 incrementing method step

The invention claimed is:

1. An engine synchronisation means of an internal combustion engine having a crank-shaft and a camshaft geared together with a fixed rotation ratio, an engine position corresponding to an angular position of the crank-shaft associated to an angular position of the camshaft, the synchronisation means being adapted to have said engine position recognized by an engine control unit (ECU), said synchronisation means comprising:
a crank-shaft wheel adapted to be fixed to the crank-shaft, and cooperating with a first sensor; and
a camshaft wheel adapted to be fixed to the camshaft and cooperating with a second sensor;
wherein the crank-shaft wheel and the camshaft wheel are both being provided with peripheral features having edges;
wherein the first sensor and the second sensor are both adapted to detect the edges of the peripheral features and to communicate to the ECU binary signals corresponding to a state of the crank-shaft wheel and the camshaft wheel, the ECU detecting any change of state and recording said binary signals as a string of bits;
wherein the peripheral features of the crank-shaft wheel are arranged as per a sequential pattern, a virtual sliding window of a specific width covering a unique set of features corresponding to a unique string of consecutive bits mapping to a unique angular position of the crank-shaft; and
wherein the peripheral features of the crank-shaft wheel are arranged according to a 60-bit de Bruijn sequence using Manchester encoding.

2. An engine synchronisation means as claimed in claim 1, wherein:
the peripheral features of the crank-shaft wheel are teeth separated by gaps or holes spread around a peripheral area of the crank-shaft wheel or a rim of the crank-shaft wheel; and
the peripheral features of the camshaft wheel are high level sectors separated by low level sectors.

3. An engine synchronisation means as claimed in claim 1, wherein said engine synchronisation means is arranged so that a rotation of the crank-shaft by a predetermined elementary angle corresponds to rotating the crank-shaft wheel before said sliding window by said predetermined elementary angle and shifting the sliding window by a single bit, said string of bits thus identifying a new angular position of the crank-shaft.

4. An engine synchronisation means as claimed in claim 3, wherein the fixed rotation ratio sets a plurality of camshaft angular positions for each single crank-shaft angular position, this raising an ambiguity on the exact engine position when determining the crank-shaft angular position, said ambiguity being resolved and the exact engine position being determined by the state of the camshaft wheel detected by the second sensor.

5. An engine synchronisation means as claimed in claim 4 wherein said rotation ratio is 2:1 so that, to a single crank-shaft angular position corresponds two diametrically opposed camshaft angular positions, the exact engine position being precisely determined by the peripheral features of the camshaft wheel, the peripheral features of the camshaft wheel being arranged so that the binary signal corresponding to a feature of the camshaft wheel differs from the binary signal corresponding to the feature diametrically opposed of the camshaft wheel.

6. An engine synchronisation means as claimed in claim 5, wherein the sequential pattern according to which the features of the crank-shaft are arranged is a de Bruijn sequence.

7. An engine synchronisation means as claimed in claim 6, wherein the crank-shaft wheel only comprises large features and narrow features, the large features being twice the width of the narrow features.

8. An engine synchronisation means as claimed in claim 7, wherein the de Bruijn sequence is implemented using Manchester encoding, ensuring the presence of a feature edge every 6°, said predetermined elementary angle being 6°.

9. An engine synchronisation means as claimed in claim 8, wherein said de Bruijn sequence is 60 bits in length, implemented using Manchester code over the circumference of the crank-shaft.

10. An engine synchronisation means as claimed in claim 9, wherein the peripheral features of the crank-shaft wheel alternate forty-five teeth with forty-five gaps.

11. An engine synchronisation means as claimed in claim 8, wherein the specific width of the sliding window is 36° spanning a unique set of the peripheral features of the crank-shaft wheel corresponding to a string of 6 consecutive bits, unique with each increment of the predetermined elementary angle.

12. An internal combustion engine provided with the engine synchronisation means as claimed in claim 1.

13. A control method of the engine as claimed in claim 12 the method comprising a preparation phase performed while the engine is not yet rotating, the steps of the preparation phase being identified with letter "a" and, an operating phase executed when the engine rotates and identified with letter "b"; the preparation phase comprising the steps:

a1) recording in the ECU, a feature pattern of the crank-shaft wheel, a feature pattern of the camshaft wheel and the complete 60-bit de Bruijn sequence corresponding to one revolution of the crank-shaft and the corresponding Manchester coded representation;

a2) creating and recording a conversion table by dividing said 60-bit sequence into sixty unique 6-bit-words, each of the sixty 6-bit-words comprising 6-consecutive-bits, each of the sixty 6-bit-words corresponding to a unique crank-shaft angular position;

a3) creating and memorising an edge location table, derived by finding an angular position of each change or edge in the Manchester coded crank-wheel;

a4) recording in the ECU, a tooth pattern configuration of the camshaft wheel;

a5) identifying in the ECU, a relative alignment of the crankshaft wheel and the camshaft wheel so that their states can be used to determine the engine position;

the operating phase comprising the steps:

b1) recording the first signal containing tooth edge information in the transition between high level signal and a low-level, and calculating a dynamic ratio of the interval between edges compared to the previous interval;

b2) applying a first threshold of 0.667 or a second threshold of 1.50 to classify each detected ratio as either 'fast rising', 'fast falling', 'slow rising' or 'slow falling', relative to a previous ratio;

b3) defining the integrated 'chipstate' that is first limited to integer values [−1, 0, 1] and then incremented or decremented upon each new edge by adding a value specific to the edge classification:
fast rising edges=+1,
slow rising edge=+2,
slow falling edge=−2
fast falling edge=−1;

b4) extracting the underlying De Bruijn sequence by collating the non-zero chipstate values where '−1' indicates binary 'zero', and '+1' indicates binary 'one'; zero Chipstate are derived from intermediate non-data bearing edges and shall be discarded;

b5) recording the data-bits obtained at step b4) into a stream and:

b6) when 6-consecutive bits are recorded; determining the crank-shaft angular position using the conversion table of step a2) by searching in said conversion table the same 6-data-bit word;

b7) reading the binary value detected by the second sensor;

b8) identifying in the record of step a5) the exact engine position in combining the information obtained at steps b6) and b7).

14. The control method as claimed in claim 13 further comprising a re-casting step to resolve the initial speed ambiguity, said re-casting step being performed after the recording step and before the determining step:

b9) if a half-size tooth is detected, too small to match the current Manchester pair-pattern, then re-casting previous half-portion teeth as 'large' double-size teeth and decoding again on that basis.

15. The control method as claimed in claim 13 further comprising a 3° shifting step to resolve any phase error, said shifting step being performed after the recording step of b1) and before the determining step of b6):

b10) if a large gap or a large tooth appear in an invalid sequence in the Manchester code, due to very rapid deceleration of the wheel, this is naturally and automatically corrected, re-cast as a narrow gap or tooth by the limiting operation in step b3).

16. The control method as claimed in claim 13 further comprising steps enabling determination of further engine position with enhanced precision, once an initial engine position is known:

c1) detecting the edges of the peripheral features of the crank-shaft wheel;

c2) incrementing the crank-shaft angular position as indicated by the edge location table, this being recorded at step a3) and, thus determining the new engine position.

* * * * *